US009641715B2

(12) United States Patent
Shimazaki

(10) Patent No.: US 9,641,715 B2
(45) Date of Patent: May 2, 2017

(54) INFORMATION PROCESSING DEVICE, METHOD, AND MEDIUM

(71) Applicant: PFU LIMITED, Kahoku-shi, Ishikawa (JP)

(72) Inventor: Katsuhito Shimazaki, Kahoku (JP)

(73) Assignee: PFU LIMITED, Ishikawa (JP)

( * ) Notice: Subject to any disclaimer, the term of this patent is extended or adjusted under 35 U.S.C. 154(b) by 48 days.

(21) Appl. No.: 14/713,882

(22) Filed: May 15, 2015

(65) Prior Publication Data
US 2016/0227066 A1 Aug. 4, 2016

(30) Foreign Application Priority Data

Jan. 30, 2015 (JP) .................. 2015-017383

(51) Int. Cl.
G06K 9/00 (2006.01)
H04N 1/04 (2006.01)
H04N 1/00 (2006.01)
H04N 1/44 (2006.01)

(52) U.S. Cl.
CPC ........... *H04N 1/04* (2013.01); *G06K 9/00449* (2013.01); *G06K 9/00463* (2013.01); *H04N 1/00244* (2013.01); *H04N 1/00307* (2013.01); *H04N 1/4413* (2013.01); *G06K 2209/01* (2013.01); *H04N 2201/0081* (2013.01)

(58) Field of Classification Search
CPC .... H04N 1/04; H04N 1/00244; H04N 1/4413; H04N 2201/0081; H04N 1/00307; G06K 2209/01; G06K 9/00449; G06K 9/00463
USPC ....................................................... 382/100
See application file for complete search history.

(56) References Cited

U.S. PATENT DOCUMENTS 6,035,061 A * 3/2000 Katsuyama ........ G06K 9/00469
382/101
2006/0062492 A1 3/2006 Masuichi et al.
2006/0198559 A1 9/2006 Manico et al.
(Continued)

FOREIGN PATENT DOCUMENTS

JP 05-159101 A * 6/1993 ............... G06K 9/20
JP 09-134406 A * 5/1997 ............... G06K 9/20
(Continued)

OTHER PUBLICATIONS

Notice of Rejection dated Apr. 26, 2016, issued in counterpart Japanese Patent Application No. 2015-017383, with English abstract. (9 pages).

*Primary Examiner* — Gregory F Cunningham
(74) *Attorney, Agent, or Firm* — Westerman, Hattori, Daniels & Adrian, LLP

(57) ABSTRACT

Provided is an information processing device including: a specifying unit that specifies a plurality of parts where a character string is described in image data; a layout information acquiring unit that acquires, for each of the plurality of specified parts, layout information including the position of the part in the image data and the size of described characters; and an estimating unit that calculates, for each of the plurality of parts, a likelihood as a character string having a predetermined attribute that can be included in the image data based on a positional relationship with other parts and on a size relationship with other parts, and estimates a part where a character string having the predetermined attribute is described based on the likelihood.

18 Claims, 11 Drawing Sheets

(56) References Cited

U.S. PATENT DOCUMENTS

| | | | |
|---|---|---|---|
| 2007/0050419 A1* | 3/2007 | Weyl | G06Q 30/00 |
| 2008/0181505 A1 | 7/2008 | Wu et al. | |
| 2008/0187221 A1* | 8/2008 | Konno | G06K 9/00449 |
| | | | 382/175 |

FOREIGN PATENT DOCUMENTS

| | | | | |
|---|---|---|---|---|
| JP | 9-134406 A | | 5/1997 | |
| JP | 10-275196 A | * | 10/1998 | ............... G06K 9/20 |
| JP | 10-334182 A | * | 12/1998 | ............... G06K 9/20 |
| JP | 11-232381 A | * | 8/1999 | ............... G06K 9/20 |
| JP | 2006-072512 | | 3/2006 | |
| JP | 2006-072512 A | * | 3/2006 | ............. G06F 17/30 |
| JP | 2006-85582 A | | 3/2006 | |
| JP | 2008-171380 A | | 7/2008 | |
| JP | 2008-538148 A | | 10/2008 | |

\* cited by examiner

FIG. 9

| RECORD | DATE FORMAT |
|---|---|
| 1 | [YEAR]/[MONTH]/[DAY] |
| 2 | [YEAR], [MONTH], [DAY] |
| 3 | YEAR [YEAR] MONTH [MONTH] DAY [DAY] |
| 4 | [MONTH]/[DAY]/[YEAR] |
| 5 | . . . |

FIG. 10

| RECORD | LAYOUT INFORMATION AND MODIFIED TITLE |
|---|---|
| 1 | ROW 1 {SIZE, VERTICAL POSITION OF ROW, HORIZONTAL POSITION OF ROW, . . . , },<br>ROW 2 {SIZE, VERTICAL POSITION OF ROW, HORIZONTAL POSITION OF ROW, . . . , TITLE ROW FLAG},<br>ROW 3 {SIZE, VERTICAL POSITION OF ROW, HORIZONTAL POSITION OF ROW, . . . , DATE ROW FLAG},<br>ROW 4 {SIZE, VERTICAL POSITION OF ROW, HORIZONTAL POSITION OF ROW, . . . , } |
| 2 | ROW 1 {SIZE, VERTICAL POSITION OF ROW, HORIZONTAL POSITION OF ROW, . . . , },<br>ROW 2 {SIZE, VERTICAL POSITION OF ROW, HORIZONTAL POSITION OF ROW, . . . , DATE ROW FLAG},<br>ROW 3 {SIZE, VERTICAL POSITION OF ROW, HORIZONTAL POSITION OF ROW, . . . , },<br>ROW 4 {SIZE, VERTICAL POSITION OF ROW, HORIZONTAL POSITION OF ROW, . . . , TITLE ROW FLAG} |
| 3 | , , , |

INFORMATION PROCESSING DEVICE, METHOD, AND MEDIUM

CROSS-REFERENCE TO RELATED APPLICATION

This application is based upon and claims the benefit of priority of the prior Japanese Patent Application No. JP2015-017383, filed on Jan. 30, 2015, the entire contents of which are incorporated herein by reference.

FIELD

The present disclosure relates to a technique for processing image data.

BACKGROUND

Conventionally, a title extraction device is proposed which scans black pixels in a document image; extracts a rectangular area that circumscribes an area in which the black pixels are connected as a character rectangle; integrates a plurality of adjacent character rectangles and extracts a rectangular area that circumscribes the character rectangles as a character string rectangle; calculates points of title likelihood based on attributes of each character string rectangle such as an underline attribute, a frame attribute, and a ruled line attribute, the position of the character string rectangle in the document image, and a mutual positional relationship; and extracts a character string rectangle having the most points as a title rectangle (refer to Japanese Patent Application Laid-open No. H9-134406).

In addition, a document processing device is proposed which includes: storage means for storing construction data representing a construction of a character string having a high possibility or a character string having a low possibility of becoming a title of a document; input means for inputting document data that represents a computerized document; extracting means for analyzing document data that is input to the input means and extracting character string data that represents a character string; construction analyzing means for analyzing each piece of character string data extracted by the extracting means and specifying, for each character string, a construction of the character string that is described in a document corresponding to the document data; and specifying means for specifying, among character string data extracted by the extracting means, character string data representing a title of a document corresponding to the document data based on a specification result by the construction analyzing means and storage contents of the storage means (refer to Japanese Patent Application Laid-open No. 2006-085582).

Furthermore, various methods of generating a name of image data are proposed (refer to Japanese Patent Application Laid-open No. 2008-171380 and Japanese Patent Application Laid-open No. 2008-538148).

SUMMARY

An example of the present disclosure is an information processing device including: specifying means for specifying a plurality of parts where a character string is described in image data; layout information acquiring means for acquiring, for each of the plurality of parts specified by the specifying means, layout information including the position of the part in the image data and the size of described characters; and estimating means for calculating, for each of the plurality of parts, a likelihood as a character string having a predetermined attribute that can be included in the image data based on a positional relationship with other parts and on a size relationship with other parts, and estimating a part where a character string having the predetermined attribute is described based on the likelihood.

The present disclosure may be viewed as an information processing device, a system, a method that is executed by a computer, and a program to be executed by a computer.

In addition, the present disclosure may be viewed as a recording of such a program on a recording medium that is readable by a device such as a computer, a machine, or the like.

In this case, a recording medium that is readable by a computer or the like refers to a recording medium which stores information such as data and programs by an electric action, a magnetic action, an optical action, a mechanical action, or a chemical action and which can be read by a computer or the like.

BRIEF DESCRIPTION OF THE DRAWINGS

FIG. 9 is a schematic diagram showing a configuration of a format information table related to dates which is used in an embodiment;

FIG. 10 is a schematic diagram showing a configuration of a layout information table used in an embodiment.

DESCRIPTION OF EMBODIMENTS

Hereinafter, an embodiment of an image data processing server, a system, a method, and a program according to the present disclosure will be described with reference to the drawings. It should be noted that the embodiment described below merely exemplifies the present disclosure and is not intended to limit an image data processing server, a system, a method, and a program according to the present disclosure to the specific configurations described below. When implementing the present disclosure, a specific configuration may be adopted as appropriate in accordance with each embodiment. In addition, various improvements and modification may be made to the present disclosure.

As the present embodiment, an embodiment in which an image data processing server, a system, a method, and a program according to the present disclosure are implemented in a system that is interlocked with a scanner will be described. However, an image data processing server, a system, a method, and a program according to the present disclosure can be widely used with respect to techniques for processing image data acquired by an imaging device. Accordingly, objects of application of the present disclosure are not limited to the examples described in the present embodiment.

Configuration of System

Figure 1:
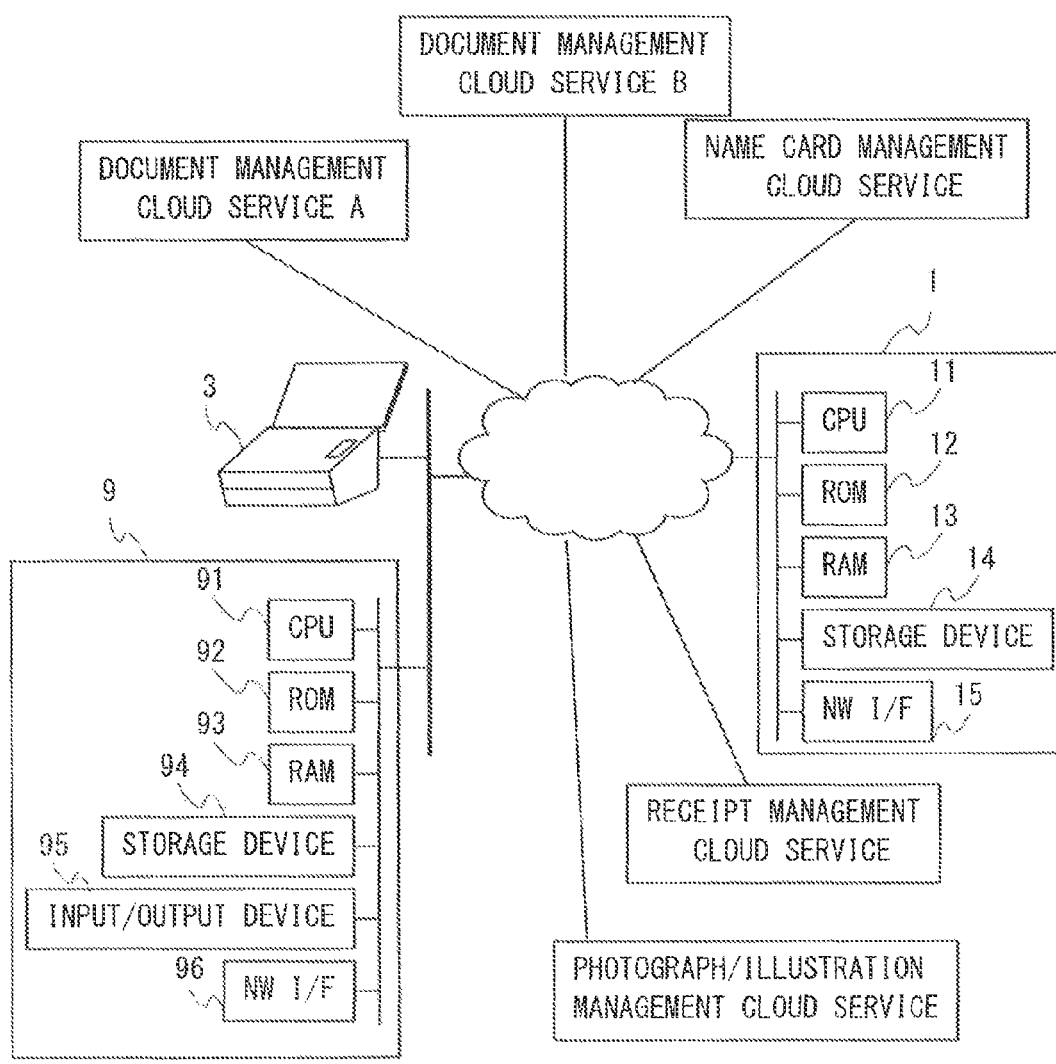
FIG. 1 is a schematic diagram showing a configuration of a system according to an embodiment.

FIG. 1 is a schematic diagram showing a configuration of a system 1 according to the present embodiment. The system 1 according to the present embodiment includes a scanner 3 and an image data processing server 1 which are connected via a network such as the Internet or a wide area network.

The image data processing server 1 is a computer including a central processing unit (CPU) 11, a read only memory (ROM) 12, a random access memory (RAM) 13, a storage device 14 that is an electrically erasable and programmable read only memory (EEPROM), an hard disk drive (HDD), or the like, a communicating unit 15, and the like. Moreover, while the image data processing server 1 is shown in the drawing to be a computer housed in a single case for the sake of simplicity, in the present embodiment, the image data processing server 1 provides an image data processing service to a user by having apart of or all of its functions executed by a device installed at a remote location or a plurality of devices installed in a distributed manner using cloud technology or the like. However, the configuration of the image data processing server 1 is not limited to the configuration exemplified in the present embodiment.

Figure 2:
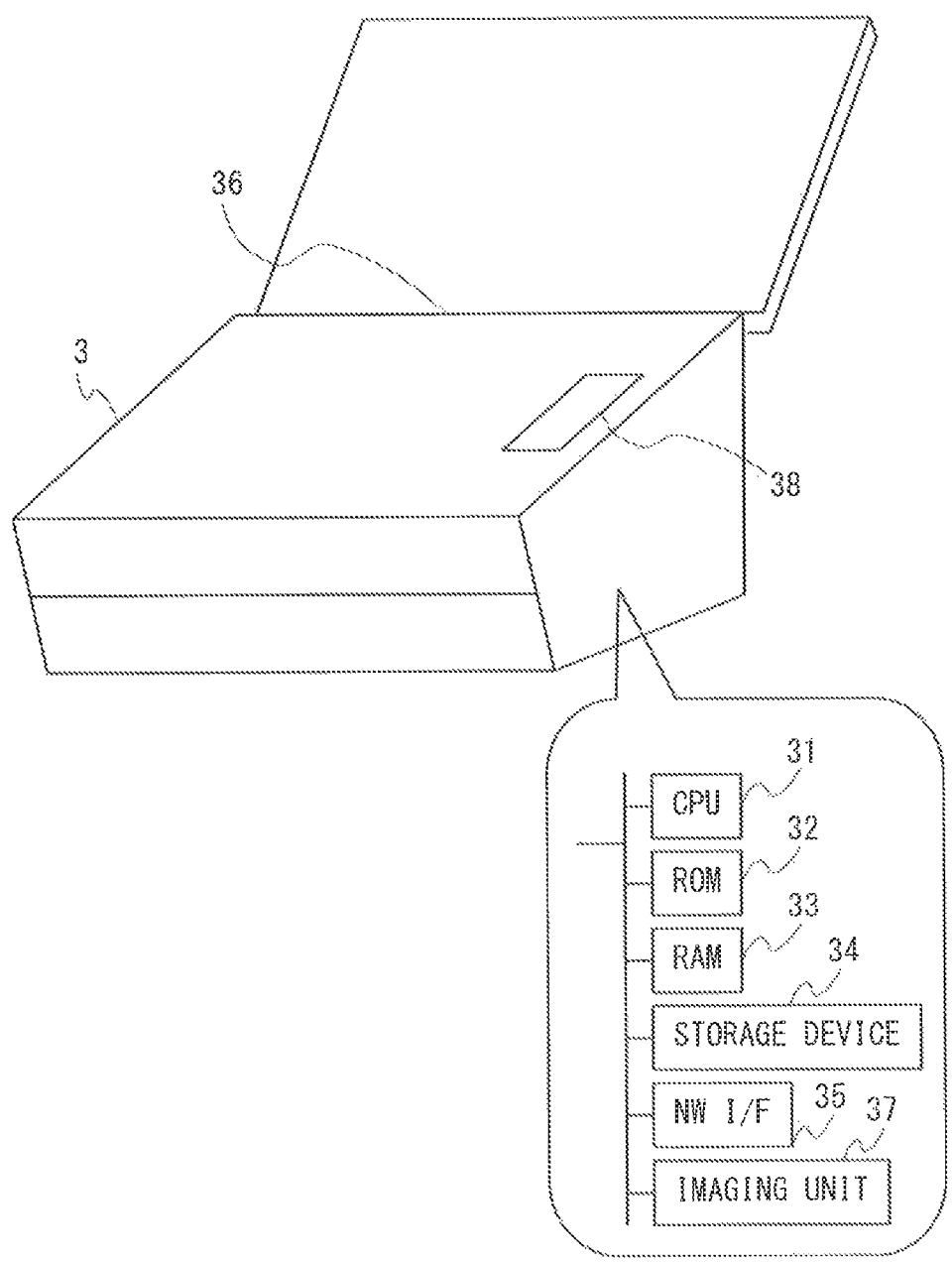
FIG. 2 is a diagram showing a hardware configuration of a scanner according to an embodiment.

FIG. 2 is a diagram showing a hardware configuration of the scanner 3 according to the present embodiment. The scanner 3 is a device which acquires image data by capturing an image of an original document such as a document, a name card, a receipt, and a photograph/illustration set by the user and is an imaging device including a sheet feeder 36 that feeds an original document to an imaging unit 37, the imaging unit 37, a scan button 38, a CPU 31, a ROM 32, a RAM 33, a storage device 34, a communicating unit 35, and the like. Moreover, while a scanner 3 adopting an image system in which images of an original document set in the sheet feeder 36 are captured while the original document is being automatically fed is exemplified in the present embodiment, the imaging system of a scanner is not restrictive. For example, a scanner of a type in which an image of an original document set at a reading position by the user may be used. In addition, while an example of using the scanner 3 as an imaging device to be used in the present system will be described in the present embodiment, the imaging device to be used in the present system is not limited to a scanner. For example, a camera may be adopted as the imaging device.

The scanner 3 according to the present embodiment is capable of connecting to a wireless LAN due to being provided with a wireless communication function. In addition, while the scanner 3 according to the present embodiment includes the scan button 38 that is pressed or touched by the user to instruct the scanner 3 to capture an image, the scanner 3 does not include a user interface that enables character input/output and item selection such as a touch panel display and a keyboard nor does the scanner 3 include a web browser function and a server function. However, communicating means, hardware configuration, and the like of a scanner capable of adopting the method according to the present embodiment is not limited to those exemplified in the present embodiment.

In addition, a user terminal 9 such as a so-called smartphone, a tablet, and a personal computer is connected to the system according to the present embodiment. The user terminal 9 is a computer including a CPU 91, a ROM 92, a RAM 93, a storage device 94, an input/output device 95, a communicating unit 96, and the like. As shown in FIG. 1, the user terminal 9 may communicate with the scanner 3 and the image data processing server 1 by being connected to a local network to which the scanner 3 is connected or may communicate with the scanner 3 and the image data processing server 1 by being connected to a mobile phone network.

Furthermore, an application for using the system according to the present embodiment has been downloaded to and installed in the user terminal 9 in advance. The application enables settings and the like to be made on the scanner 3 via the network. Therefore, a user interface that enables character input/output and item selection such as a touch panel display and a keyboard can be omitted from the scanner 3 according to the present embodiment. In addition, the application enables accounts to be created, login and logout to be performed, settings to be made, and the like on the image data processing server 1 via the network. As a result, with the system according to the present embodiment, by simply operating the user terminal 9 to complete preparations related to the entire system, setting an original document on the scanner 3, and operating the scan button 38, the user can transmit data obtained from the original document to an appropriate cloud service.

In addition, the image data processing server 1 and the user terminal 9 are capable of communicating with a plurality of cloud services (including services provided by third parties) on the Internet which provide various services to the user. Moreover, while hardware configurations of cloud services other than the image data processing server 1 are not illustrated in FIG. 1, each of the cloud services features computers with the same hardware configuration as the image data processing server 1 being installed in a distributed manner using cloud technology. While examples of these cloud services include a document management service, a name card management service, a receipt management service, and a photograph/illustration management service, cloud services that can be interlocked with the system 1 according to the present embodiment are not limited to those exemplified in the present disclosure.

Figure 3:
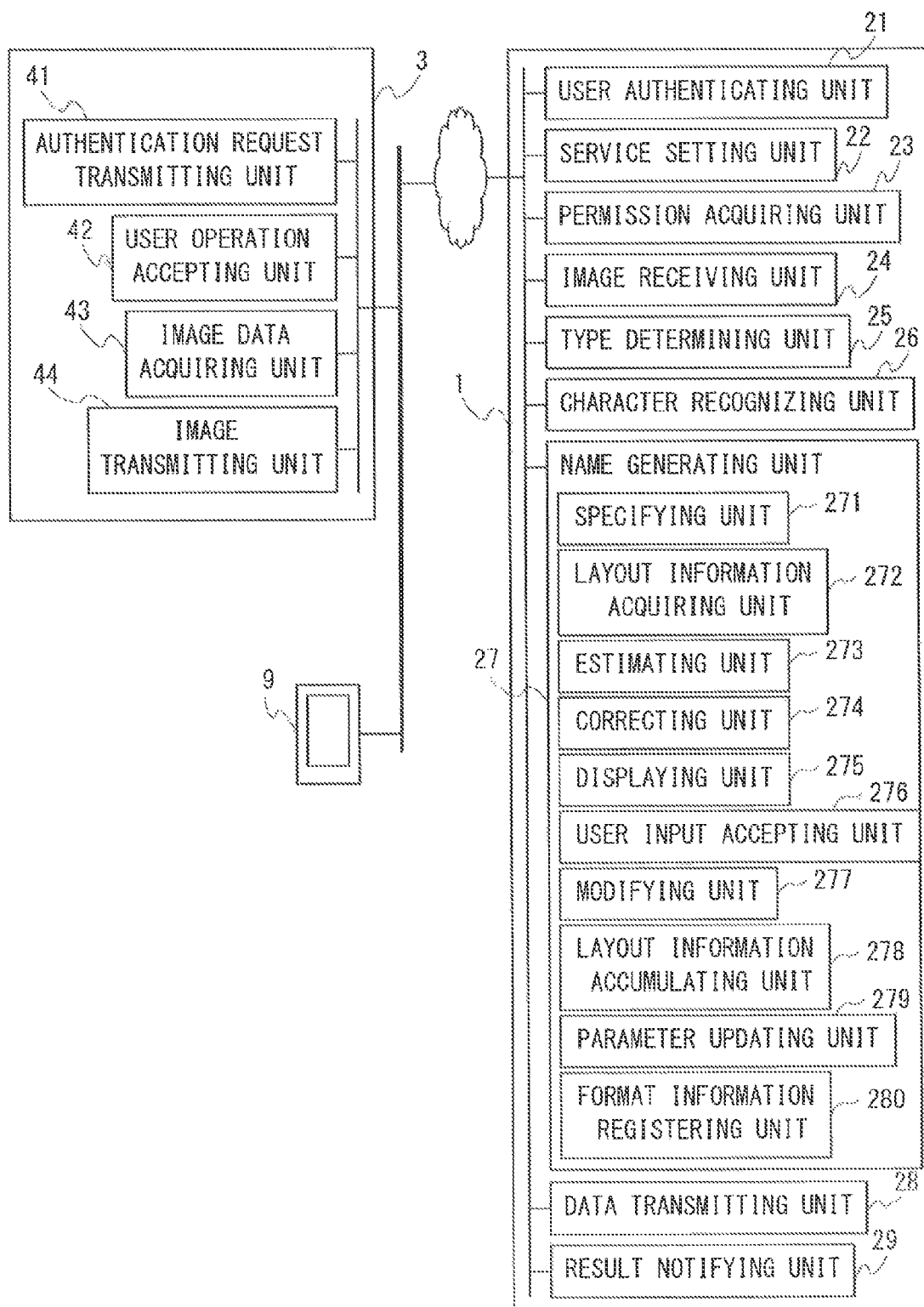
FIG. 3 is a diagram schematically showing a functional configuration of a system according to an embodiment.

FIG. 3 is a diagram schematically showing a functional configuration of the system according to the present embodiment. As respective hardware included in the image data processing server 1 are controlled by having a program recorded in the storage device 14 read by the RAM 13 and executed by the CPU 11, the image data processing server 1 functions as a device that includes a user authenticating unit 21, a service setting unit 22, a permission acquiring unit 23, an image receiving unit 24, a type determining unit 25, a character recognizing unit 26, a name generating unit 27, a data transmitting unit 28, and a result notifying unit 29. Moreover, in the present embodiment, the respective functions of the image data processing server 1 are executed by the CPU 11 that is a general purpose processor. Alternatively, a part of or all of the functions may be executed by one or a plurality of dedicated processors.

In response to an authentication request transmitted from the user terminal 9 or the scanner 3, the user authenticating unit 21 authenticates the user of the user terminal 9 or the scanner 3. The authentication request includes authentication information necessary for authentication. In the present embodiment, while a user ID and a password are used as authentication information, other information may be used as authentication information. Moreover, since the scanner 3 according to the present embodiment does not include a user interface that enables character input/output and item selection as described earlier, an authentication request is transmitted to the image data processing server 1 using authentication information, the notification of which is issued from the user terminal 9 to the scanner 3.

In the present embodiment, an access token (hereinafter, referred to as an "image data processing server access token" to distinguish the access token from a cloud service access token to be described later) is used to authenticate the user. Upon receiving an authentication request from the user terminal 9 or the scanner 3, the user authenticating unit 21 verifies authentication information included in the authentication request, and when the authentication information is appropriate, transmits an image data processing server access token to a transmission source of the authentication request (the user terminal 9 or the scanner 3). The user terminal 9 or the scanner 3 having received the image data processing server access token subsequently communicates with the image data processing server 1 using the image data processing server access token.

The service setting unit 22 sets a cloud service specified by the user as a transmission destination of image data and the like when the image data is of a predetermined type as a predetermined cloud service. In other words, with the image data processing server 1 according to the present embodiment, a data transmission destination cloud service in a case where image data is image data of a predetermined type can be set as a cloud service desired by the user. For example, when there are a plurality of document management services (for example, the document management service A and the document management service B shown in FIG. 1), by specifying a desired document management cloud service to the image data processing server 1 via an application that runs on the user terminal 9, the user can set a cloud service to be a transmission destination of data in a case where image data is document image data as a document management service that is specified by the user. This also applies to cloud services that manage data related to image data of other types or, in other words, to a name card management service, a receipt management service, and a photograph/illustration management service.

The permission acquiring unit 23 transmits an access permission request with respect to a predetermined cloud service in accordance with a request transmitted from the user-authenticated user terminal 9 and acquires access permission to a user account of the predetermined cloud service from the predetermined cloud service.

In the present embodiment, OAuth 2.0 authentication is used as means for receiving access permission from a cloud service and an access token (hereinafter, referred to as a "cloud service access token" to distinguish the access token from the image data processing server access token described earlier) is used as access permission. By transmitting an access permission request to each cloud service set by the service setting unit 22 among the cloud services that are interlocked with the present system, the image data processing server 1 receives an access token that is issued by each cloud service. The received access token for each cloud service is associated with an account of the user in the image data processing server 1 and saved in the image data processing server 1.

The image receiving unit 24 receives, via the network, image data which is acquired by and transmitted from the user-authenticated scanner 3.

The type determining unit 25 determines a type of the received image data. Moreover, in the present embodiment, the type that is determined by the type determining unit 25 includes at least any of a document, a name card, a receipt, and a photograph/illustration. However, the type of image data that can be determined by the type determining unit 25 is not limited to the types exemplified in the present embodiment.

The character recognizing unit 26 performs optical character recognition (OCR) on image data.

The name generating unit 27 generates a name of image data or data generated based on the image data, using a character string obtained as a result of optical character recognition. As the name of data, for example: when the determination by the type determining unit 25 reveals that the type of image data is a document, the name generating unit 27 generates a character string including a title and a creation date of the document; when the determination by the type determining unit 25 reveals that the type of image data is a name card, the name generating unit 27 generates a character string including a name and an organization name; and when the determination by the type determining unit 25 reveals that the type of image data is a receipt, the name generating unit 27 generates a character string including a store name and a received date.

Moreover, in the present embodiment, in order to generate a name of image data or data generated based on the image data, the name generating unit 27 includes a specifying unit 271, a layout information acquiring unit 272, an estimating unit 273, a correcting unit 274, a displaying unit 275, a user input accepting unit 276, a modifying unit 277, a layout information accumulating unit 278, a parameter updating unit 279, and a format information registering unit 280 to be described below.

The specifying unit 271 specifies a plurality of parts where a character string is described in image data.

The layout information acquiring unit 272 acquires, for each of the plurality of parts specified by the specifying unit 271, layout information including the position of the part in the image data and the size of described characters.

The estimating unit 273 calculates, for each of the plurality of parts, a likelihood as a character string (hereinafter, also referred to as an "attribute character string") having a predetermined attribute that can be included in the image data based on a positional relationship with other parts and on a size relationship with other parts, and estimates a part (hereinafter, also referred to as a "part describing an attribute character string") where a character string having the predetermined attribute is described based on the likelihood. When a part describing an attribute character string is estimated by the estimating unit 273, the character recognizing unit 26 at least performs character recognition on a part that is estimated to be the part describing an attribute character string by the estimating unit 273 in the image data.

Moreover, in the present embodiment, a part describing an attribute character string is a part where a character string suitable for classifying image data of a type determined by the type determining unit 25 is described. An attribute character string acquired from the part describing an attribute character string is used as a character string for generating a name of data. Specifically, when the type determined by the type determining unit 25 is a document, the estimating unit 273 calculates, for each of the plurality of parts, a likelihood as a character string that includes a title and a likelihood as a character string that includes a date, and estimates a part where a character string including a title is described and a part where a character string including a date is described. In addition, when the type determined by the type determining unit 25 is a name card, the estimating unit 273 calculates, for each of the plurality of parts, a likelihood as a character string that includes a name and a likelihood as a character string that includes an organization name, and estimates a part where a character string including a name is described and a part where a character string including an organization name is described. Furthermore, when the type determined by the type determining unit 25 is a receipt, the estimating unit 273 calculates, for each of the plurality of parts, a likelihood as a character string that includes a store name and a likelihood as a character string that includes a date, and estimates apart where a character string including a store name is described and a part where a character string including a date is described.

When layout information of image data matches or approximates layout information that is accumulated by the layout information accumulating unit 278, the correcting unit 274 corrects the part estimated by the estimating unit 273 based on the part that is associated with the matching or approximating layout information and is specified by the user as a part describing an attribute character string.

The displaying unit 275 displays the plurality of parts that have been specified by the specifying unit 271 so that the part estimated by the estimating unit 273 to be a part describing an attribute character string is recognizable by the user.

The user input accepting unit 276 accepts input of a modification by the user having confirmed display contents by the displaying unit 275. Contents of the modification that is input at this point include a part describing an attribute character string and specified by the user and an attribute character string input by the user.

The modifying unit 277 modifies a character string to be used for name generation by the name generating unit 27 based on the input of a modification by the user.

When an input of a modification by the user is accepted by the user input accepting unit 276, the layout information accumulating unit 278 associates a part that is specified by the user as a correct part describing an attribute character string in object image data and layout information of the object image data that is acquired by the layout information acquiring unit 272 with each other and accumulates the same in a layout information table.

When input of a modification by the user is accepted by the user input accepting unit 276, the parameter updating unit 279 updates a parameter such that the likelihood calculated with respect to the part that is specified by the user as apart describing an attribute character string takes a higher value.

When user input of an attribute character string is accepted by the user input accepting unit 276, the format information registering unit 280 registers format information that is specified from the accepted character string.

When the type determining unit 25 determines that image data is of a predetermined type, the data transmitting unit 28 transmits the image data or data generated based on the image data (hereinafter, simply referred to as "data") to a user account of a predetermined cloud service. When transmitting data to the user account of the cloud service, an access token that is saved in the image data processing server 1 in association with an account of a user who has been authenticated by the user authenticating unit 21 as the user of the scanner 3 having transmitted the image data is used among the respective cloud service access tokens acquired from the respective cloud services by the permission acquiring unit 23.

Accordingly, when the type determining unit 25 determines that image data is document image data, the data transmitting unit 28 can transmit the image data or data generated based on the image data to a user account of a document management service specified by a user who has been authenticated as the user of the scanner 3 having transmitted the image data using an access token acquired from the document management service with respect the user.

The result notifying unit 29 notifies the user of a result (completion, failure, and the like) of data transmission by the data transmitting unit 28 by performing a release result notification.

As respective hardware included in the scanner 3 are controlled by having a program recorded in the storage device 34 read by the RAM 33 and executed by the CPU 31, the scanner 3 functions as a device that includes an authentication request transmitting unit 41, a user operation accepting unit 42, an image data acquiring unit 43, and an image transmitting unit 44. Moreover, in the present embodiment, the respective functions of the scanner 3 are executed by the CPU 31 that is a general purpose processor. Alternatively, a part of or all of the functions may be executed by one or a plurality of dedicated processors.

The authentication request transmitting unit 41 transmits, to the image data processing server 1, an authentication request including authentication information, the notification of which is issued from the user terminal 9 to the scanner 3.

The user operation accepting unit 42 accepts a predetermined user operation. In the present embodiment, as the predetermined user operation, pressing or touching the scan button 38 provided on the scanner 3 is accepted as a user operation for collectively instructing a series of processes from starting a scan to transmitting data to an appropriate cloud service. However, the predetermined user operation that triggers a scan to start is not limited to the example according to the present disclosure.

When the predetermined user operation is accepted by the user operation accepting unit 42, the image data acquiring unit 43 acquires image data by capturing an image of an object. Specifically, when an operation of the scan button 38 is accepted by the user operation accepting unit 42, the image data acquiring unit 43 of the scanner 3 according to the present embodiment acquires image data of an original document by controlling the sheet feeder 36 to send the original document to the imaging unit 37 and then controlling the imaging unit 37 to capture an image of the original document.

The image transmitting unit 44 transmits the image data acquired by the image data acquiring unit 43 to the image data processing server 1 via the network. In addition, transmission of image data by the image transmitting unit 44 is executed following the acquisition of the image data without involving operations other than the predetermined user operation (in the present embodiment, an operation of the scan button 38).

Flow of Processes

Next, a flow of processes executed by the system 1 according to the present embodiment will be described. It is to be understood that specific contents and a specific sequence of processes described below merely represent one example of implementing the present disclosure. Specific contents and sequences of the processes may be appropriately selected in accordance with embodiments of the present disclosure.

Figure 4:
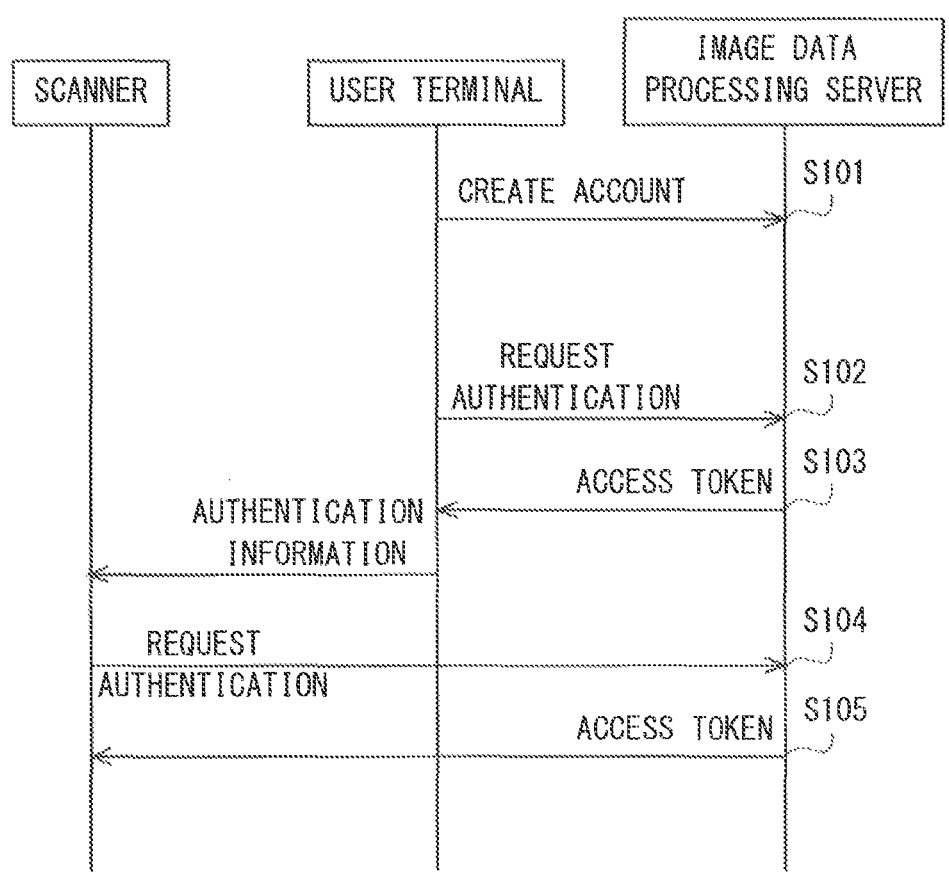
FIG. 4 is a sequence diagram showing an outline of a flow of an account creation/user authentication process according to an embodiment.

FIG. 4 is a sequence diagram showing an outline of a flow of an account creation/user authentication process according to the present embodiment.

In step S101, a user account is created. The user starts an application on the user terminal 9 that is a smartphone or the like. The started application prompts the user to input information (such as a user ID and a password) which is required to create an account and transmits the information input by the user to the image data processing server 1. The image data processing server 1 determines whether or not the information received from the user terminal 9 is appropriate, and when the information is determined to be appropriate, creates an account of the user. In addition, the application saves authentication information (in the present embodiment, a user ID and a password) for logging into the created user account, in the user terminal 9.

In steps S102 and S103, a login process to the image data processing server 1 is performed by the user terminal 9. In response to an authentication request transmitted from the user terminal 9, the user authenticating unit 21 authenticates the user of the user terminal 9. Specifically, upon receiving an authentication request from the user terminal 9 (step S102), the user authenticating unit 21 verifies authentication information that is included in the authentication request, and when the authentication information is consistent with the account information created in step S101, the user authenticating unit 21 transmits an image data processing server access token to the user terminal 9 that is a transmission source of the authentication request (step S103). The user terminal 9 having received the image data processing server access token subsequently communicates with the image data processing server 1 using the received access token.

In addition, after creating an account in the image data processing server 1, the user starts an application on the user terminal 9 and causes the user terminal 9 to be connected to the scanner 3 via a wireless network. Furthermore, the application notifies the scanner 3 of the authentication information which is created in step S101 and saved in the user terminal 9 and which is used to log into the image data processing server 1. The authentication request transmitting unit 41 of the scanner 3 having received the notification of the authentication information transmits an authentication request including the authentication information to the image data processing server 1.

In steps S104 and S105, a login process to the image data processing server 1 is performed by the scanner 3. When the authentication request transmitted by the scanner 3 is received by the image data processing server 1 (step S104), the user authenticating unit 21 of the image data processing server 1 authenticates the user of the scanner 3. The user authenticating unit 21 verifies the authentication information included in the authentication request that is received from the scanner 3, and when the authentication information is consistent with the account information created in step S101, the user authenticating unit 21 transmits an image data processing server access token to the scanner 3 that is a transmission source of the authentication request (step S105). The scanner 3 having received the image data processing server access token subsequently communicates with the image data processing server 1 using the received access token.

Figure 5:
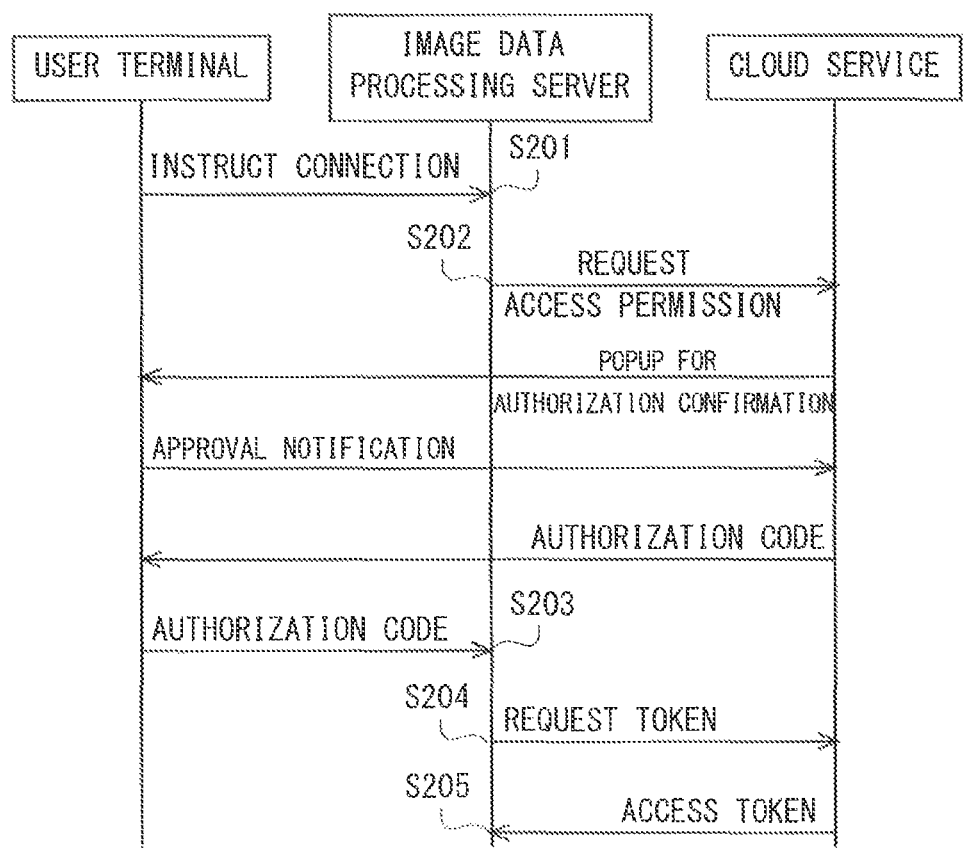
FIG. 5 is a sequence diagram showing an outline of a flow of a permission acquisition process according to an embodiment.

FIG. 5 is a sequence diagram showing an outline of a flow of a permission acquisition process according to the present embodiment. Execution of the permission acquisition process according to the present embodiment is triggered by the start of an application for using the system according to the present embodiment by the user. Moreover, while OAuth 2.0 authentication is used as means for receiving access permission from a cloud service in the present embodiment, other means may alternatively be used for the authentication.

In steps S201 and S202, an access permission request with respect to the cloud service is performed. By starting the application on the user terminal 9 and operating an agent of the application, the user connects the user terminal 9 to a website provided by the image data processing server 1. Moreover, while a web browser that is implemented in the application is used in the present embodiment, other web browsers that are installed in the user terminal 9 may alternatively be used to connect to the website provided by the image data processing server 1.

Subsequently, when the website of the image data processing server 1 receives an instruction to connect to the cloud service which is issued by the user via the web browser (step S201), the permission acquiring unit 23 of the image data processing server 1 transmits an access permission request to the cloud service (step S202). The access permission request represents a request made by the image data processing server 1 for using an account of the user of each cloud service. Moreover, the user account of each cloud service may be set in advance by the user or may be newly created via the application. As described earlier with reference to the service setting unit 22 and the permission acquiring unit 23, the user can specify a desired cloud service for each type of image data, in which case the permission acquiring unit 23 transmits an access permission request to a cloud service that is specified by the user.

The cloud service having received the access permission request displays a popup for authorization confirmation on the user terminal 9. Subsequently, when the user having confirmed the displayed popup performs an operation for approving (granting) the use of the account of the user of the cloud service related to the popup by the image data processing server 1, the cloud service is notified of the approval by the user, from the web browser.

In step S203, the cloud service having received the notification of the user's approval provides an authorization code to the image data processing server 1 via the web browser of the user terminal 9. The permission acquiring unit 23 of the image data processing server 1 receives, via the user terminal 9, the authorization code transmitted by the cloud service. Subsequently, the process proceeds to step S204.

In steps S204 and S205, a cloud service access token is acquired. The permission acquiring unit 23 of the image data processing server 1 transmits an access token request including the authorization code to the cloud service (step S204) and acquires an access token from the cloud service in exchange for the authorization code (step S205). The acquired access token for each cloud service is associated with an account of the user in the image data processing server 1 and saved in the image data processing server 1. Subsequently, the process shown in the present sequence diagram is finished.

As a result of the processes shown in FIGS. 4 and 5 described above, an access token for the image data processing server 1 is acquired by the scanner 3, an access token for the cloud service is acquired by the image data processing server 1, and user accounts thereof are associated with each other. Therefore, with the system according to the present embodiment, a transmission (release) of scan data from the scanner 3 to the cloud service via the image data processing server 1 can be performed as will be described later with reference to FIG. 6.

Figure 6:
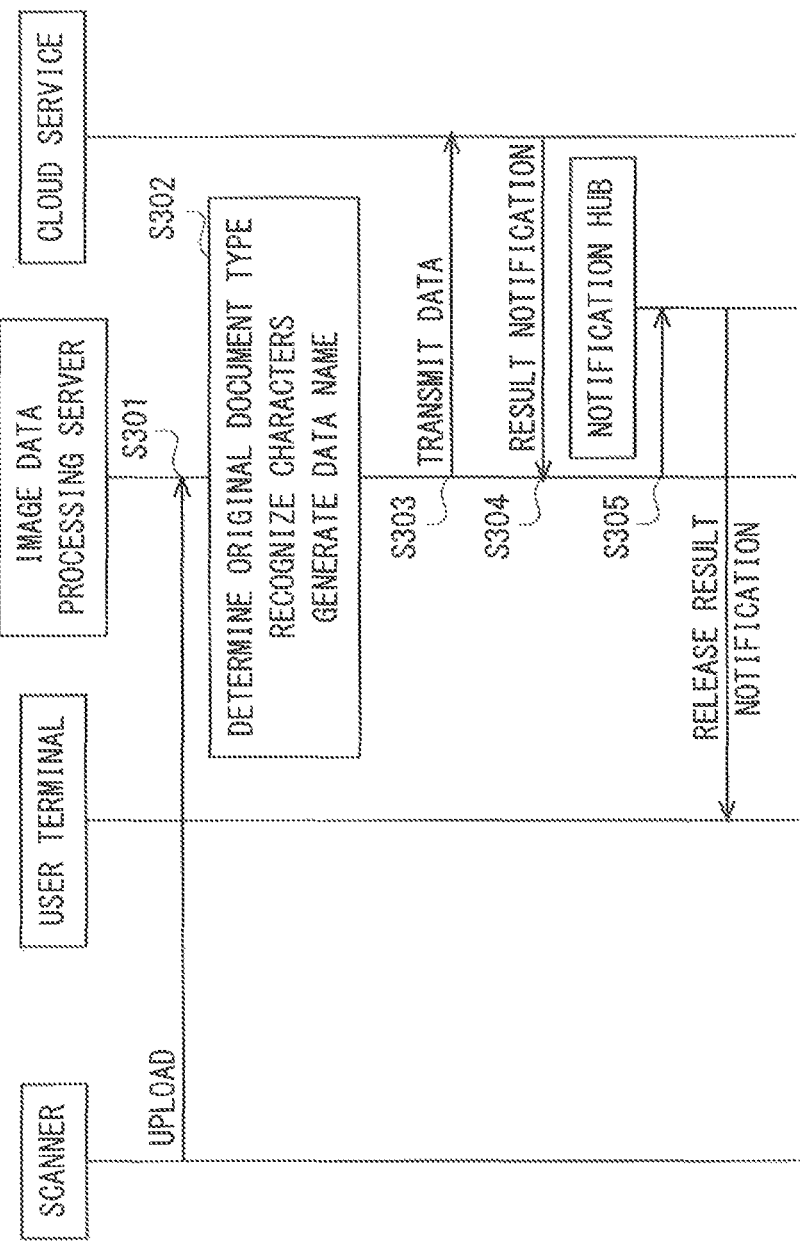
FIG. 6 is a sequence diagram showing an outline of a flow of an image data process according to an embodiment.

FIG. 6 is a sequence diagram showing an outline of a flow of an image data process according to the present embodiment. Execution of the image data process according to the present embodiment is triggered by the mounting of an original document on the scanner 3 and the user operating the scan button 38 of the scanner 3.

In step S301, scanned image data is uploaded to the image data processing server 1. When an operation of the scan button 38 is accepted by the user operation accepting unit 42 of the scanner 3, the image data acquiring unit 43 acquires image data of the original document by sending the original document to the imaging unit 37 using the sheet feeder 36 and causing the imaging unit 37 to capture an image of the original document. In addition, the image transmitting unit 44 of the scanner 3 transmits the acquired image data to the image data processing server 1. In this case, the image data processing server access token acquired in advance in step S105 is used for the transmission.

In addition, transmission of image data by the image transmitting unit 44 in the present embodiment is executed following the acquisition of the image data without involving user operations other than an operation of the scan button 38. The image receiving unit 24 of the image data processing server 1 receives image data transmitted from the scanner 3. In addition, by inspecting an access token that is received together with the image data, the image receiving unit 24 confirms whether or not the received image data has been transmitted from a user-authenticated scanner 3. When the received image data has not been received from a user-authenticated scanner 3, the process shown in the present sequence diagram is finished (not illustrated). On the other hand, when the received image data has been received from a user-authenticated scanner 3, the process proceeds to step S302.

In step S302, automatic discrimination of original document type is performed. The type determining unit 25 determines whether the received image data is image data related to any type of a document, a name card, a receipt, and a photograph/illustration. While a determination system based on image characteristics such as layout recognition, character recognition, color recognition and document size recognition can be used to determine the type, the determination system is not limited to the example described in the present disclosure and various techniques including known techniques as well as techniques to be developed in the future can be adopted to determine the type.

In addition, the character recognizing unit 26 performs optical character recognition (OCR) on the image data. Furthermore, the name generating unit 27 generates a name of image data or data generated based on the image data, using a character string acquired as a result of the optical character recognition. A specific method of name generation is as described earlier. Moreover, the image data is not limited to a data format received from the scanner and may be converted into a format suitable for the determined original document type such as Portable Document Format (PDF). Subsequently, the process proceeds to step S303.

In step S303, a cloud service corresponding to the original document type is identified and data is transmitted to the concerned cloud service. The data transmitting unit 28 transmits the image data or data generated based on the image data and a generated name in accordance with the original document type determined in step S302 to a user account of the cloud service corresponding to the original document type. For the transmission of data to the user account of the cloud service, each cloud service access token which has been acquired in step S205 and which is saved in association with the user account of the image data processing server 1 is used. Subsequently, the process proceeds to step S304.

In steps S304 and S305, a release result is transmitted. When data transmission by the data transmitting unit 28 is completed and a result notification is received from the cloud service that is a transmission destination (step S304), the result notifying unit 29 of the image data processing server 1 notifies the user of completion, failure, or the like of the data transmission by performing a release result notification (step S305). Specifically, the result notifying unit 29 notifies a notification function or an application provided in the user terminal 9 as a standard feature that data has been transmitted to a predetermined cloud service and is saved in the cloud service via a predetermined notification hub service (for example, the Azure notification hub) which enables a push notification to be issued to the user terminal 9. However, other techniques may be adopted in order to issue the result notification. Subsequently, the process shown in the present sequence diagram is finished.

Figure 7:
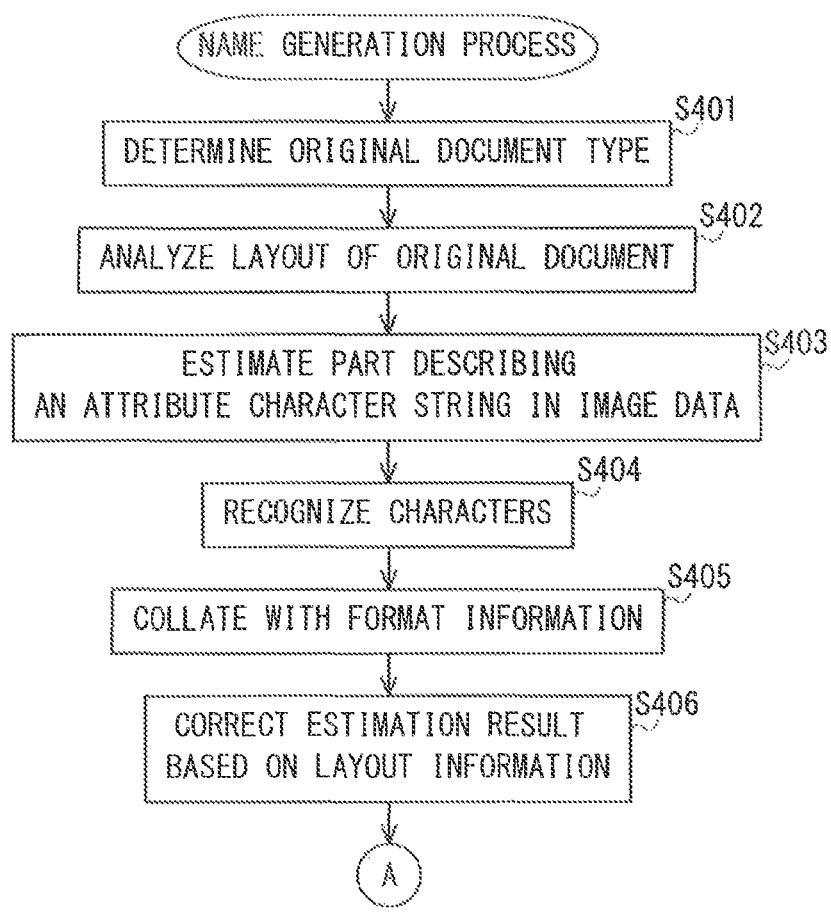
FIG. 7 is a first half of a flow chart showing an outline of a flow of a name generation process according to an embodiment.
Figure 8:
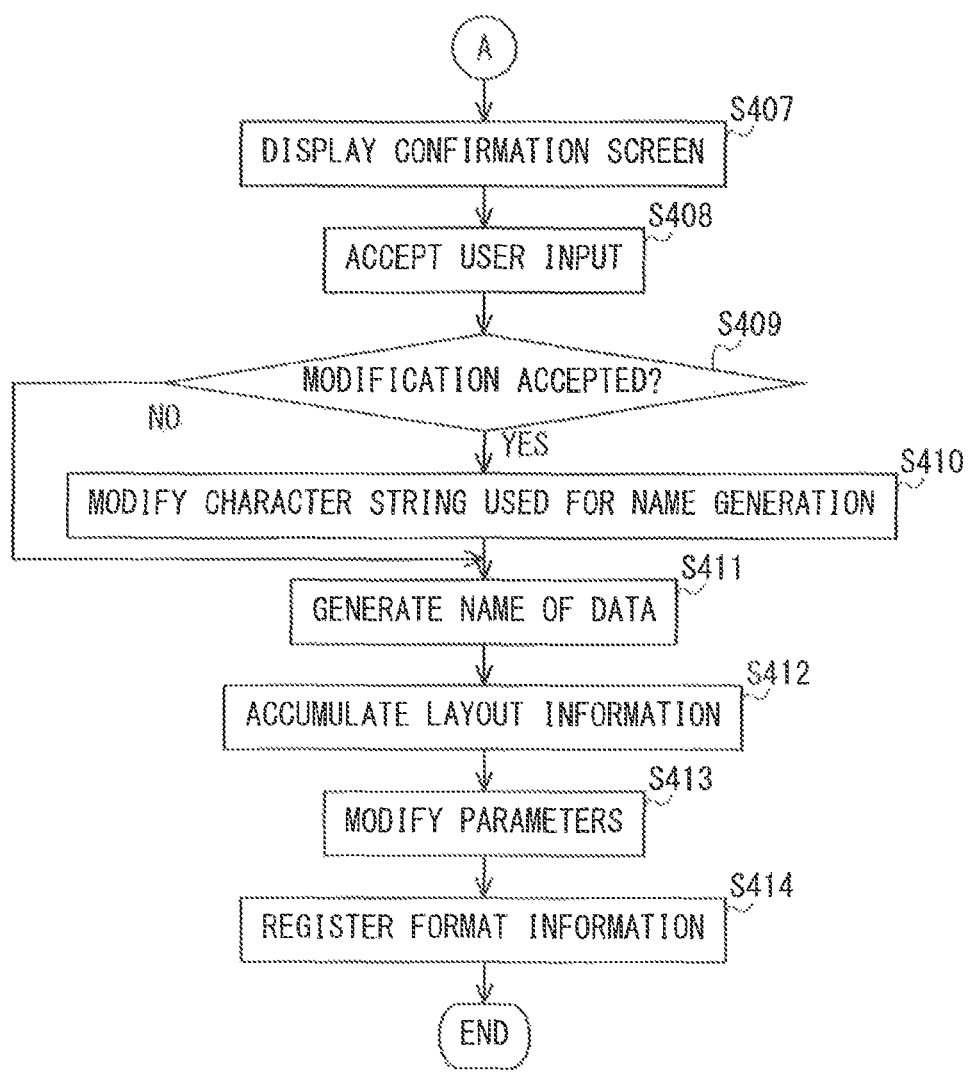
FIG. 8 is a second half of a flow chart showing an outline of a flow of a name generation process according to an embodiment.

FIGS. 7 and 8 are flow charts showing an outline of a flow of a name generation process according to the present embodiment. The description of the name generation process given below is a detailed description of the process of step S302 described above, and execution of the name generation process is triggered by the reception by the image receiving unit 24 of the image data processing server 1 of image data transmitted from the scanner 3. Moreover, in the present embodiment, while an example in which the name generation process is executed by the image data processing server 1 is described, an entity which executes the name generation process is not limited to the image data processing server 1. For example, the name generation process may be performed by a scanner or by a personal computer to which a scanner is connected as a peripheral device.

In step S401, an original document type is determined. The type determining unit 25 determines whether received image data is image data related to any type of a document, a name card, a receipt, and a photograph/illustration. In the present embodiment, the type of an original document is determined based on size information of the original document that is acquired together with image data. For example, since a size of a name card is generally 55 mm by 91 mm, an original document whose size matches or approximates this size can be determined to be a name card. In addition, since a size of a receipt often includes a width of any of 38 mm, 45 mm, 60 mm, and 110 mm, an original document whose width matches or approximates these sizes can be determined to be a receipt. Furthermore, in the present embodiment, an original document that is determined not to be a photograph/illustration by layout recognition, character recognition, or color recognition among original documents of other sizes is determined to be a document. Subsequently, the process proceeds to step S402.

In step S402, a layout of the original document is analyzed. The specifying unit 271 specifies a plurality of parts where a character string is described in the image data, and the layout information acquiring unit 272 acquires, for each of the plurality of parts specified by the specifying unit 271, layout information including the position of the part in the image data and the size of described characters. More specifically, for each part (row) where a character string is described in the image data, the layout information acquiring unit 272 acquires layout information including a size, a vertical position of the row in the image data, and a horizontal position of the row in the image data. Moreover, in the present embodiment, the vertical position of a row is indicated by a distance from an upper end of an original document. In addition, the horizontal position of a row is indicated by a distance from a left end of an original document or by information describing whether the row is left-justified, right-justified, or centered. Subsequently, the process proceeds to step S403.

In step S403, a part describing an attribute character string in the image data is estimated. For each of the plurality of parts specified in step S402, the estimating unit 273 calculates a likelihood as an attribute character string that can be included in the image data based on a relative relationship (in the present embodiment a positional relationship and a size relationship) with other parts, and estimates a part describing an attribute character string based on the likelihood. The calculation of likelihood includes an operation for adjusting, using a parameter, a score related to a positional relationship and a score related to a size relationship. Hereinafter, a specific method of calculating a likelihood according to the present embodiment will be described.

In the present embodiment, the estimating unit 273 calculates a likelihood based on a relationship (position, size, distance, or the like) with other surrounding character strings. The estimating unit 273 compares likelihoods calculated for respective parts, and estimates a part with a highest likelihood to be a part describing an attribute character string (for example, a title or a date of a document, a name or an organization name of a name card, and a store name or a date of a receipt). For example, when an original document type of image data is determined to be a document, the estimating unit 273 calculates a likelihood indicating a possibility of each part being a title of the document using the equation shown below.

Title likelihood=(*a*\*position score *A*)+(*b*\*size score *B*)+(*c*\*distance score *C*)

In this case, contents of the position score A, the size score B, and the distance score C are as follows.

Position score *A*=10−positional order from upper part of original document

Size score *B*=candidate character size (height)/character size in main text

Distance score *C*=distance to nearest leftward character string+distance to nearest rightward character string+distance to nearest upward character string+distance to nearest downward character string However, when a positional order from the upper part of the original document is 10th or lower, "position score=0" is used. In addition, the parameters a, b, and c are parameters used to correct the scores described above when calculating likelihoods and are corrected in step S413 to be described later.

Furthermore, for example, when an original document type of image data is determined to be a document, the estimating unit 273 calculates a likelihood indicating a possibility of each part being a date of the document using the equation shown below.

Date likelihood=(*a*\*position score *A*)+(*b*\*size score *B*)+(*c*\*format score *C*)

In this case, contents of the position score A, the size score B, and the format score C are as follows.

Position score *A*=10−positional order from upper right part of original document Size score *B*=absolute value of (candidate character size (height)−character size in main text)

Format score *C*=number of characters matching format

However, when a positional order from the upper part of the original document is 10th or lower, "position score=0" is used. In addition, the "number of characters matching format" which is used to calculate the format score C is the number of matching characters (including numerical values and delimiters) between format information of a date and a comparison character string. At the time point of step S403, since character recognition of a date candidate (step S404) is yet to be performed and the number of characters cannot be counted, a date likelihood is calculated by temporarily setting the format score to "0". In addition, the parameters a, b, and c are parameters used to correct the scores described above when calculating likelihoods and are corrected in step S413 to be described later.

When a part describing an attribute character string is estimated in the image data, the process advances to step S404.

In step S404, character recognition is performed. The character recognizing unit 26 at least performs character recognition on a part that is estimated to be the part describing an attribute character string by the estimating unit 273 in step S403 in the image data. In the present embodiment, for each of the attributes (for example, a title or a date of a document, a name or an organization name of a name card, and a store name or a date of a receipt), the character recognizing unit 26 specifies a top few parts in a descending order of likelihood and performs character recognition. For example, when the original document is a document, character recognition is performed on top three parts related to title likelihood and top five parts related to date likelihood.

A character string obtained by character recognition from a part with a highest likelihood with respect to a predetermined attribute is used for name generation of data in step S411 to be described later. For example, among character strings related to a plurality of parts obtained by character recognition from image data of a document, a title character string obtained by character recognition from a part with a highest title likelihood and a date character string obtained by character recognition from a part with a highest date likelihood are used for name generation of the document data. In addition, character strings related to parts with second highest and lower likelihoods may be saved as candidates to be selectable by the user when performing modification in step S408 to be described later. These character strings may be embedded in an image data file or may be saved in a file (for example, an XML file) that differs from image data. Subsequently, the process proceeds to step S405.

In step S405, format collation is performed. The estimating unit 273 corrects likelihood based on a collation result between a character string acquired by the character recognizing unit 26 and format information registered in advance. Since character recognition of a date candidate has been performed in step S404, the estimating unit 273 calculates "format score C=number of characters matching format", which had been temporarily set to "0" in step S403, by collating a character string of the date candidate and date format information with each other. The estimating unit 273 re-calculates date likelihoods using the updated format score C and estimates a character string obtained by character recognition from a part with a highest date likelihood as a date character string. Moreover, the format collation process described in the present step may be omitted depending on an attribute of a character string. For example, when a character string of a title candidate is acquired from image data whose original document type is a document, the estimating unit 273 may assume the entirety of the acquired character string to be a title of the document without particularly performing format collation.

FIG. 9 is a schematic diagram showing a configuration of a format information table related to dates which is used in the present embodiment. Format information is a definition of a format that can be used in a character string related to a given attribute. In the example shown in FIG. 9, a list of a combination of sequences of [year], [month], and [day] as well as delimiters (comma "," and slash "/") is registered as date formats in a format information table related to dates. Moreover, format information may be defined with respect to attributes other than dates. For example, symbols such as brackets may be defined as format information with respect to titles, and characters reading "Corporation" or "Corp." may be defined as format information with respect to company names. In addition, a method of defining a format in formation information is not limited to the example described in the present embodiment. For example, a format may be defined using regular expressions. Subsequently, the process proceeds to step S406.

In step S406, an estimation result is corrected based on layout information. The correcting unit 274 compares the layout information of image data that is a process object acquired in step S402 with layout information accumulated in the layout information table. When layout information that matches or approximates the layout information of image data that is a process object is retrieved from the layout information table as a result of the comparison, the correcting unit 274 corrects the part estimated by the estimating unit 273 based on the part that is associated with the matching or approximating layout information and is specified by the user as a part describing an attribute character string. The layout information that is used for comparison at this point is layout information of an original document for which an estimation result by the estimating unit 273 has been modified in the past by the user. In other words, with respect to image data of a layout matching or approximating layout information related to a past modification, the correcting unit 274 performs a correction process that is similar to the past modification. Subsequently, the process proceeds to step S407.

FIG. 10 is a schematic diagram showing a configuration of a layout information table that is used in the present embodiment. In the layout information table, layout information related to one original document and contents of modification performed on the original document are combined and accumulated as one record. Original documents which have not been modified by the user are not accumulated in the layout information table. More specifically, for each part (row) where a character string is described in the image data, the layout information includes a size, a vertical position of the row in the image data, and a horizontal position of the row in the image data. In addition, contents of a modification performed on the original document are indicated by attaching a flag to information of a part (row) that is specified by the modification. In the example shown in FIG. 10, a title row flag is attached to information of a row considered to be a title row by a user modification and a date row flag is attached to information of a row considered to be a date row by a user modification. Moreover, in the layout information table, a record of layout information that is accumulated last is accumulated to be compared first in the comparison process in step S406, and orders of previously accumulated records in the comparison process are sequentially decremented. Accordingly, a priority of modification that is recently accumulated can be increased.

In steps S407 and S408, a confirmation screen is displayed and a user input is accepted. The displaying unit 275 displays a confirmation screen including the plurality of parts that have been specified by the specifying unit 271 so that the part estimated by the estimating unit 273 to be a part describing an attribute character string is recognizable by the user (step S407). In addition, the user input accepting unit 276 accepts input of a modification by the user having confirmed display contents by the displaying unit 275 (step S408). Subsequently, the process proceeds to step S408.

Figure 11:
FIG. 11 is a diagram showing an outline of a confirmation screen that is displayed on a user terminal 9 in an embodiment.

FIG. 11 is a diagram showing an outline of a confirmation screen that is displayed on the user terminal 9 in the present embodiment. In the present embodiment, in order to have a user confirm estimation contents and a result of character recognition, the displaying unit 275 divides the confirmation screen into two areas and performs display using two methods.

In area 1, an original document image is displayed based on image data and a plurality of parts specified by the specifying unit 271 are shown framed on the original document image. A display position of a frame can be decided using information on coordinates and sizes included in the layout information. In this case, an area that is assumed to be a part describing an attribute character string by the processes up to step S406 is drawn using bold lines while frames of other parts are drawing using fine lines. In addition, a color of a frame differs depending on an attribute (a title, a date, a name, an organization name, a store name, or the like) of a part indicated by the frame. For example, a title-related part may be displayed in a red frame and a date-related part may be displayed in a blue frame. When a part describing an attribute character string shown on the confirmation screen is erroneous, the user can select any of the frames of the plurality of parts displayed on the original document image using input means such as a touch panel to select a correct part as the part describing an attribute character string or to modify a result of character recognition. Such a display method is suitable for a user terminal having a relatively large touch panel display such as a so-called tablet.

In area 2, a plurality of character strings obtained by character recognition are displayed as a list for each attribute (a title, a date, a name, an organization name, a store name, or the like). In the list, a character string that is estimated to be an attribute character string or a character string that is corrected in the processes up to step S406 is displayed at the top of the list and other character strings are displayed second and below on the list. When an attribute character string shown on the confirmation screen is erroneous, the user can select any of the plurality of character strings displayed on the list using input means such as a touch panel to select a character string that is related to a correct part as the part describing an attribute character string or to modify a result of character recognition. Such a display method is suitable for a user terminal having a relatively small touch panel display such as a so-called smartphone.

In the present embodiment, the confirmation screen is transmitted from the image data processing server 1 to the user terminal 9 and displayed by an application that is executed by the user terminal 9. Moreover, in the present embodiment, while a scanner that is not equipped with a display is used while being directly connected to a network and image data process is performed by the image data processing server 1, the confirmation screen is displayed on the user terminal 9. However, the confirmation screen may be output by other output devices. For example, when implementing the present disclosure using a scanner with a display, the confirmation screen may be displayed on the display of the scanner, and when the scanner is connected as a peripheral device of a personal computer, the confirmation screen may be displayed on the display of the personal computer.

In steps S409 and S410, when there is an input of a modification by the user, a character string used for name generation is modified. When an input of a modification by the user is accepted in step S408 (yes in step S409), the modifying unit 277 modifies the character string used to generate a name by the name generating unit 27 based on the input of the modification (step S410). Specifically, when a correct part as a part describing an attribute character string is selected by the user, the modifying unit 277 assumes a character string that has been obtained by the character recognition in step S404 with respect to the part selected by the user to be a correct attribute character string. In addition, when a result of the character recognition is modified by the user, a character string input by the user is assumed to be a correct attribute character string. When an input of a modification by the user is not accepted in step S408 (no in step S409) and when a modification of a character string used for name generation is completed, the process advances to step S411.

In step S411, a name of data is generated. The name generating unit 27 generates a name of data based on a character string acquired as a result of character recognition performed on a part with the highest likelihood. For example, when the original document is a document, the name generating unit 27 generates a data name by combining an acquired date character string and an acquired title character string. Subsequently, the process proceeds to step S412.

Moreover, while processing of image data whose original document type is a document has been mainly described in the present embodiment, even when processing image data related to other original document types, flow of processes are approximately similar with the exception of a method of estimating an attribute character string and a part describing an attribute character string to be extraction objects. For example, when the original document type is a name card, a name character string and an organization name character string are extracted as attribute character strings and a data name is generated using these character strings. In addition, for example, when the original document type is a receipt, a store name character string and a date character string are extracted as attribute character strings and a data name is generated using these character strings.

A process shown in steps S412 to S414 is a learning process in which information (conditions and modification contents) modified by the user is learned in order to enhance accuracy of name generation in the name generation process of next and subsequent times.

In step S412, layout information is accumulated. When an input of a modification by the user is accepted by the user input accepting unit 276, the layout information accumulating unit 278 associates apart that is specified by the user as apart describing an attribute character string and layout information that is acquired by the layout information acquiring unit 272 with each other and accumulates the same in a layout information table. The configuration of layout information is as described earlier with reference to FIG. 10. The layout information that is accumulated at this point is used to correct an estimation result as described earlier in step S406. Subsequently, the process proceeds to step S413.

In step S413, parameters are updated. When input of a modification of the user is accepted by the user input accepting unit 276, the parameter updating unit 279 updates a parameter such that the likelihood calculated with respect to the part that is specified by the user as a part describing an attribute character string takes a higher value.

For example, with respect to parameters used when calculating a title likelihood, respective scores (a position score Aa, a size score Ba, and a distance score Ca) of a "row a" that has been erroneously estimated to be a title row and respective scores (a position score Ab, a size score Bb, and a distance score Cb) of a "row b" that is a correct title row selected by a user modification are compared with one another, whereby the parameters are modified depending on magnitude relationships. More specifically, the parameter updating unit 279 compares position scores of the row a and the row b, and increases the parameter a (for example, by 3%) if position score Aa<position score Ab, and reduces the parameter a (for example, by 3%) if position score Aa>position score Ab. The parameter updating unit 279 also updates the size score and the distance score using similar methods. Subsequently, the process proceeds to step S414.

In step S414, format information is registered. When user input of an attribute character string is accepted by the user input accepting unit 276, the format information registering unit 280 registers format information that is specified from the accepted character string. The configuration of format information is as described earlier with reference to FIG. 9. For example, when a character string of a date input by the user is a date described in a format that is not registered in the format information table, the format information registering unit 280 registers the format used in a date character string related to the user input as new format information in the format information table. Subsequently, the process shown in the present flow chart is finished.

Advantageous Effects

According to the embodiment described above, a part where a character string having a predetermined attribute is described can be estimated from a captured image. In addition, by limiting parts where character recognition is to be performed based on results of estimation, a character recognition process need no longer be performed on entire image data and processing load may be reduced.

What is claimed is:
1. An information processing device comprising:
a specifying unit to specify a plurality of parts where a character string is described in image data;
a type determining unit to determine a type of the image data;
a layout information acquiring unit to acquire, for each of the plurality of parts specified by the specifying unit, layout information including a position of the part in the image data and a size of described characters; and
an estimating unit to calculate, for each of the plurality of parts, a likelihood as a character string having a predetermined attribute that can be included in the image data based on a positional relationship with other parts and on a size relationship with other parts, and esti- mating a part where a character string having the predetermined attribute is described based on the likelihood, wherein the estimating unit estimates a part where a character string having the predetermined attribute is described, by using an equation for calculating the likelihood indicating a possibility of being a character string suitable for classifying image data of the type determined, the equation is chosen according to the type determined by the type determining unit.

2. The information processing device according to claim 1, further comprising:

a character recognizing unit to perform character recognition on at least a part estimated by the estimating unit to be a part where a character string having the predetermined attribute is described in the image data; and a name generating unit to generate, using the character string acquired as a result of the character recognition, a name of the image data or data generated based on the image data.

3. The information processing device according to claim 1, wherein the type that is determined by the type determining unit includes a document, and when the type that has been determined by the type determining unit is a document, the estimating unit calculates, for each of the plurality of parts, the likelihood as a character string including a title or a character string including a date, and estimates a part where a character string including a title or a character string including a date is described based on the likelihood.

4. The information processing device according to claim 1, wherein the type that is determined by the type determining unit includes a name card, and when the type that has been determined by the type determining unit is a name card, the estimating unit calculates, for each of the plurality of parts, the likelihood as a character string including a name or a character string including an organization name, and estimates a part where a character string including a name or a character string including an organization name is described based on the likelihood.

5. The information processing device according to claim 1, wherein the type that is determined by the type determining unit includes a receipt, and when the type that has been determined by the type determining unit is a receipt, the estimating unit calculates, for each of the plurality of parts, the likelihood as a character string including a store name or a character string including a date, and estimates a part where a character string including a store name or a character string including a date is described based on the likelihood.

6. The information processing device according to claim 1, wherein the type that is determined by the type determining unit includes at least any of a document, a name card, a receipt, and a photograph/illustration.

7. The information processing device according to claim 2, further comprising:

a displaying unit to display the plurality of parts specified by the specifying unit so that the part estimated by the estimating unit to be a part where a character string having the predetermined attribute is described is recognizable by a user;

a user input accepting unit to accept an input of a modification by the user having confirmed display contents by the displaying unit; and a modifying unit to modify, based on the input of the modification, a character string used to generate a name by the name generating unit.

8. The information processing device according to claim 7, wherein the estimating unit calculates the likelihood by a process including an operation of adjusting a score related to the positional relationship and a score related to the size relationship using parameters, and the information processing device further comprises a parameter updating unit to update the parameters so that, when the input of the modification by the user is accepted by the user input accepting unit, the likelihood that is calculated with respect to a part specified by the user to be a part where a character string having the predetermined attribute is described takes a higher value.

9. The information processing device according to claim 7, further comprising:

a layout information accumulating unit to accumulate, when the input of the modification by the user is accepted by the user input accepting unit, a part specified by the user to be a part where a character string having the predetermined attribute is described and the layout information acquired by the layout information acquiring unit in association with each other; and a correcting unit to correct, when layout information of the image data matches or approximates the layout information accumulated by the layout information accumulating unit, the part estimated by the estimating unit based on the part that is associated with the matching or approximating layout information and is specified by the user to be a part where a character string having the predetermined attribute is described.

10. The information processing device according to claim 7, wherein the estimating unit corrects the likelihood based on a result of a collation between a character string acquired by the character recognizing unit and format information registered in advance.

11. The information processing device according to claim 10, wherein the user input accepting unit further accepts a user input of a character string having the predetermined attribute, and the information processing device further comprises a format information registering unit to register, when the user input of the character string having the predetermined attribute is accepted by the user input accepting unit, format information that is specified from the accepted character string.

12. The information processing device according to claim 1, further comprising an image receiving unit to receive, via a network, image data which is transmitted from and acquired by an imaging device.

13. The information processing device according to claim 12, further comprising a user authenticating unit to authenticate a user of the imaging device, wherein the image receiving unit receives, via the network, image data which is transmitted from and acquired by the user-authenticated imaging device.

14. The information processing device according to claim 13, further comprising:

a permission acquiring unit to acquire, from a predetermined service that provides a service via a network, access permission to an account of the user in the predetermined service; and a data transmitting unit to transmit, when the image data is determined to be image data of a predetermined type by the type determining unit, the image data or data generated based on the image data to the account of the user in the predetermined service, using the access permission acquired from the predetermined service with respect to a user who has been authenticated as the user of the imaging device that has transmitted the image data.

15. The information processing device according to claim 14, wherein the user authenticating unit further authenticates a user of a user terminal, and the permission acquiring unit transmits an access permission request to the predetermined service and acquires the access permission in accordance with a request transmitted from the user-authenticated user terminal.

16. The information processing device according to claim 13, wherein the user authenticating unit authenticates a user of the imaging device in response to an authentication request which is transmitted by the imaging device and which includes authentication information, the notification of which is issued from a user terminal to the imaging device.

17. A method that causes a computer to execute:

specifying a plurality of parts where a character string is described in image data;

determining a type of the image data;

acquiring, for each of the plurality of parts specified in the specification of the plurality of parts, layout information including a position of the part in the image data and a size of described characters; and calculating, for each of the plurality of parts, a likelihood as a character string having a predetermined attribute that can be included in the image data based on a positional relationship with other parts and on a size relationship with other parts, and estimating a part where a character string having the predetermined attribute is described based on the likelihood, wherein the calculating involves estimating a part where a character string having the predetermined attribute is described, by using an equation for calculating the likelihood indicating a possibility of being a character string suitable for classifying image data of the type determined, the equation is chosen according to the type determined by the determining.

18. A computer-readable non-transitory medium on which is recorded a program that causes a computer to function as:

a specifying unit to specify a plurality of parts where a character string is described in image data;

a type determining unit to determine a type of the image data;

a layout information acquiring unit to acquire, for each of the plurality of parts specified by the specifying unit, layout information including the position of the part in the image data and the size of described characters; and an estimating unit to calculate, for each of the plurality of parts, a likelihood as a character string having a predetermined attribute that can be included in the image data based on a positional relationship with other parts and on a size relationship with other parts, and estimating a part where a character string having the predetermined attribute is described based on the likelihood, wherein the estimating unit estimates a part where a character string having the predetermined attribute is described, by using an equation for calculating the likelihood indicating a possibility of being a character string suitable for classifying image data of the type determined, the equation is chosen according to the type determined by the type determining unit.

* * * * *